(12) United States Patent
Gottlieb

(10) Patent No.: US 6,978,395 B2
(45) Date of Patent: Dec. 20, 2005

(54) PROTECTION SWITCHING OF INTERFACE CARDS IN COMMUNICATION SYSTEM

(75) Inventor: Gary Gottlieb, Irvine, CA (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 446 days.

(21) Appl. No.: 10/119,483

(22) Filed: Apr. 10, 2002

(65) Prior Publication Data

US 2003/0196135 A1  Oct. 16, 2003

(51) Int. Cl.[7] .............................................. G06F 11/00
(52) U.S. Cl. ........................................................ 714/4
(58) Field of Search ........................ 714/4, 5, 43, 57; 709/239, 250; 710/301, 302

(56) References Cited

U.S. PATENT DOCUMENTS

| | | | | |
|---|---|---|---|---|
| 5,226,120 A | * | 7/1993 | Brown et al. | ................ 709/224 |
| 5,712,754 A | * | 1/1998 | Sides et al. | ..................... 361/58 |
| 6,512,774 B1 | * | 1/2003 | Vepa et al. | .................. 370/401 |
| 6,636,478 B1 | * | 10/2003 | Sensel et al. | ................ 370/216 |
| 6,639,894 B1 | * | 10/2003 | Sensel et al. | ................ 370/217 |
| 6,757,748 B1 | * | 6/2004 | Hipp | .............................. 710/2 |
| 6,763,479 B1 | * | 7/2004 | Hebert | ........................... 714/4 |
| 2002/0176355 A1 | * | 11/2002 | Mimms et al. | ............. 370/216 |
| 2003/0035408 A1 | * | 2/2003 | Hebert | ........................ 370/349 |

* cited by examiner

Primary Examiner—Scott Baderman
(74) Attorney, Agent, or Firm—Fogg and Associates, LLC; Laura A. Ryan

(57) ABSTRACT

A communication system includes primary and secondary interface cards. A switching circuit allows both of the interface cards to selectively communicate over a medium without inducing reflection. Further, an automatic detection system is provided to allow a management circuit to identify which interface card is coupled as the primary or secondary card.

19 Claims, 4 Drawing Sheets

PROTECTION SWITCHING OF INTERFACE CARDS IN COMMUNICATION SYSTEM

FIELD OF THE INVENTION

The present invention relates generally to communication systems and in particular the present invention relates to interface card for communication systems.

BACKGROUND OF THE INVENTION

Communication system often contains two interface cards to provide transceiver functions over a medium, such as a coaxial cable. The two cards include a primary card 101 and a protection card 102, see FIG. 1. The primary card 101 contains a medium control switch 103, which couples/decouples its transceiver to a communication medium 105. Protection card 102 also contains a medium control switch 104, which couples/decouples its transceiver to the telecommunication medium 105. Under normal operating conditions, the medium control switch 103 is ON and the primary card is coupled to the communication medium and performs communication functions. The protection card is in a "hot" standby mode with its medium control switch 104 turned OFF.

As soon as a management card has determined a failure on the primary card, switch 103 is turned OFF and switch 104 is turned ON. The protection card then takes over communication traffic. The primary and protection cards are typically located physically distanced one from another. As such, the communication medium, such as a coaxial cable, is split into two cables 106 and 107. While cable 106 is connected to transceiver 101 through switch 103 and is properly terminated, cable 107 is floating because switch 104 is OFF. Because cards 101 and 102 are two separate entities, floating cable 107 must have some length, that causes reflection of signal back into communication medium 105. This can cause data transfer errors because the communication signals in the medium 105 get distorted.

To reduce reflection to a sustainable level, the maximum length of the floating cable is limited. This limitation, however, restricts the design of the interface cards. As bandwidth of the signal in the cable gets wider, the length of the floating cable must decrease. Because the floating cable cannot have a zero length, the data rate of the communication equipment is limited.

For the reasons stated above, and for other reasons stated below which will become apparent to those skilled in the art upon reading and understanding the present specification, there is a need in the art for a more flexible interface card for communication system.

SUMMARY OF THE INVENTION

The above-mentioned problems with communication system and other problems are addressed by the present invention and will be understood by reading and studying the following specification.

In one embodiment, a communication system comprises a communication medium, a switch circuit, a primary interface card coupled to the communication medium via the switch circuit, and a secondary interface card coupled to the switch circuit. The secondary interface card controls the switch circuit to decouple the primary interface card from the communication medium and couple the secondary interface card to the communication medium via the switch circuit.

A communication system comprises a communication medium, a switch circuit including a relay, a first interface card coupled to the communication medium via the switch circuit, and a second interface card coupled to the relay and switch circuit. The second interface card controls the relay to decouple the first interface card from the communication medium and couple the second interface card to the communication medium via the switch circuit. A management card is coupled to the first and second interface cards and selectively activates either the first or second interface card and determines if the first or second interface card is coupled to the relay.

A method of operating a communication system comprises installing a primary interface card, installing a secondary interface card, selectively activating the primary interface card using a management card, monitoring a current load of the activated primary interface card, identifying the activated primary interface card based upon the monitored current load, and storing the identification information.

DETAILED DESCRIPTION OF THE DRAWINGS

In the following detailed description of the preferred embodiments, reference is made to the accompanying drawings, which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

Figure 1:
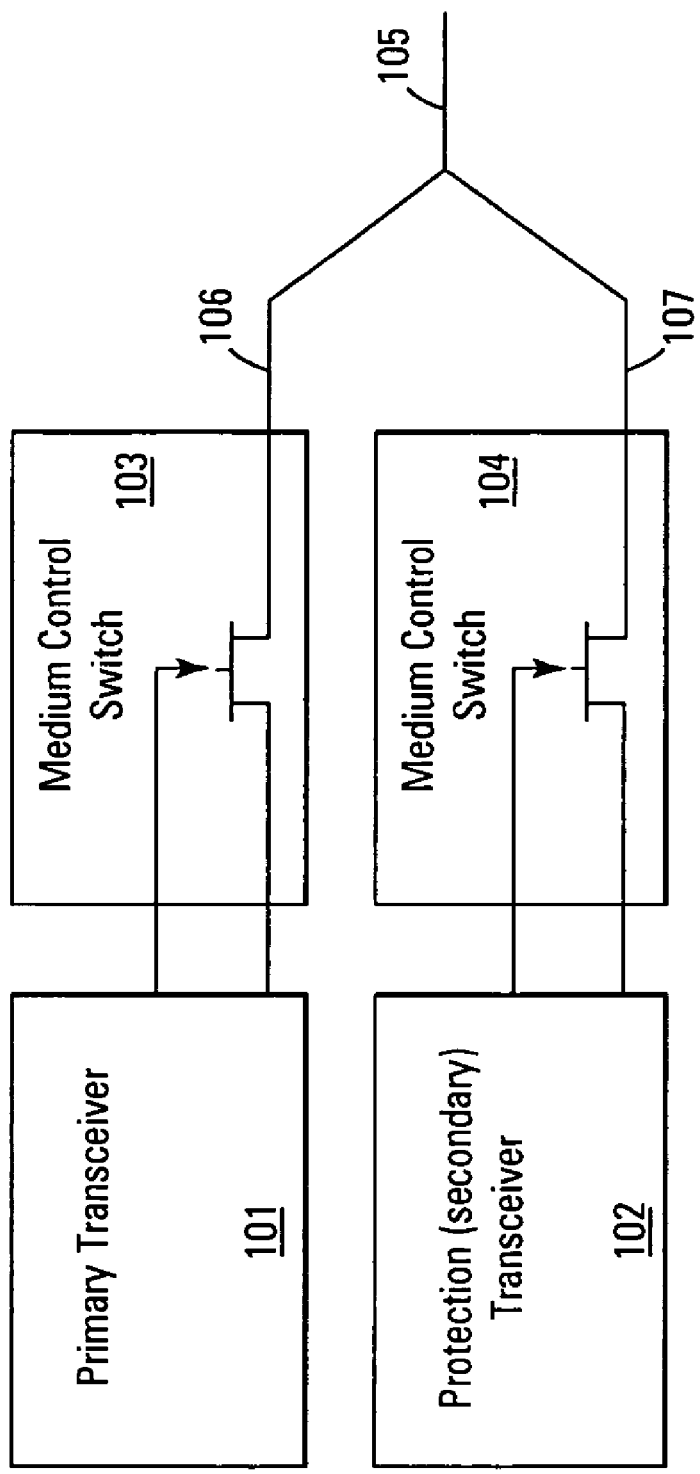
FIG. 1 is a block diagram of a prior art interface card communication system.

As explained above, prior communication system (see FIG. 1) contains two interface cards, the primary 101 and the protection 102. Under normal operating conditions, the primary card is coupled to communication medium 105 via medium control switch 103. In response to a detected failure of the primary card, protection card 102 is coupled to medium 105 via medium control switch 104 and switch 103 is turned OFF. When switch 104 is OFF, cable 107 causes reflection of signal back into communication medium 105. An embodiment of the present invention changes the switching structure of the interface card and medium connections.

Figure 2:
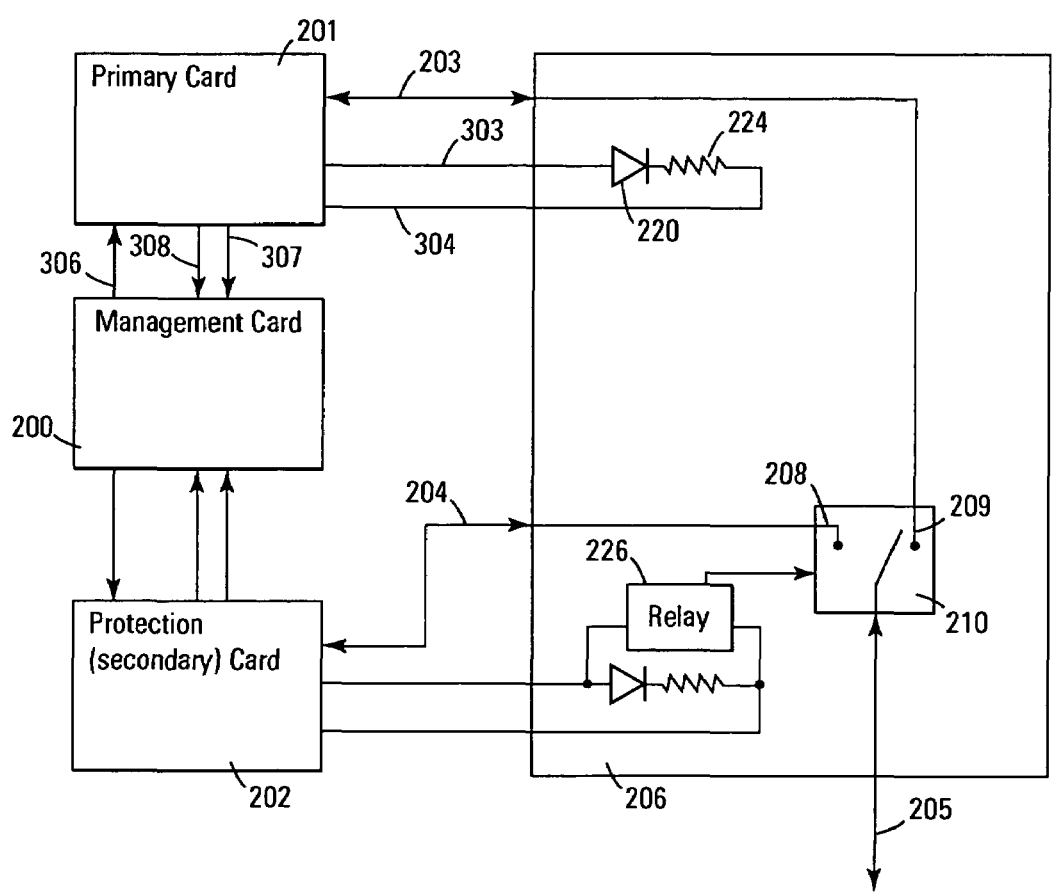
FIG. 2 is a block diagram of an embodiment of an interface card communication system of the present invention.

Referring to FIG. 2, an embodiment of the present invention contains a primary interface card 201, a protection, or secondary, card 202, a management card 200 and a single medium control switch 206. The primary and secondary cards get selectively coupled to communication medium 205 connection of the medium control switch 206. It will be appreciated that the communication mediums can be any electrical or optical medium used for communication, such as but not limited to coaxial cable and fibre optics.

Medium control switch 206 includes a switch circuit 210 to selectively couple medium 205 to cards 201 or 202 through cables 203 or 204. Using one switch allows cables 203 and 204 to be any length and does not result in reflection on medium 205. Protection card 202 controls operation of switch 206 by activating a relay 226. Under normal conditions, switch 210 connects medium 205 (position 209) to the primary card 201 through the medium 203. If management card 200 determines that a failure on the primary card 201 has occurred, the protection card turns switch 210 to position 208 to connect the protection card 202 to medium 205. Medium 205 gets properly terminated either on the primary card 201 under normal conditions or on the protection card 202 after being switched to it. The proposed solution eliminates a floating cable and the limitations on card design associated with it.

Primary card 201 has output node 303 and input node 304 that are coupled to a light-emitted diode (LED) 220 and current limiting resistor 224. When the primary card is activated by an activation signal at input 306 from the management card, LED 220 is illuminated. The management card can determine if card 201 or card 202 is coupled as the primary card, as explained in detail below, by using output nodes 307 and 308.

Figure 3:
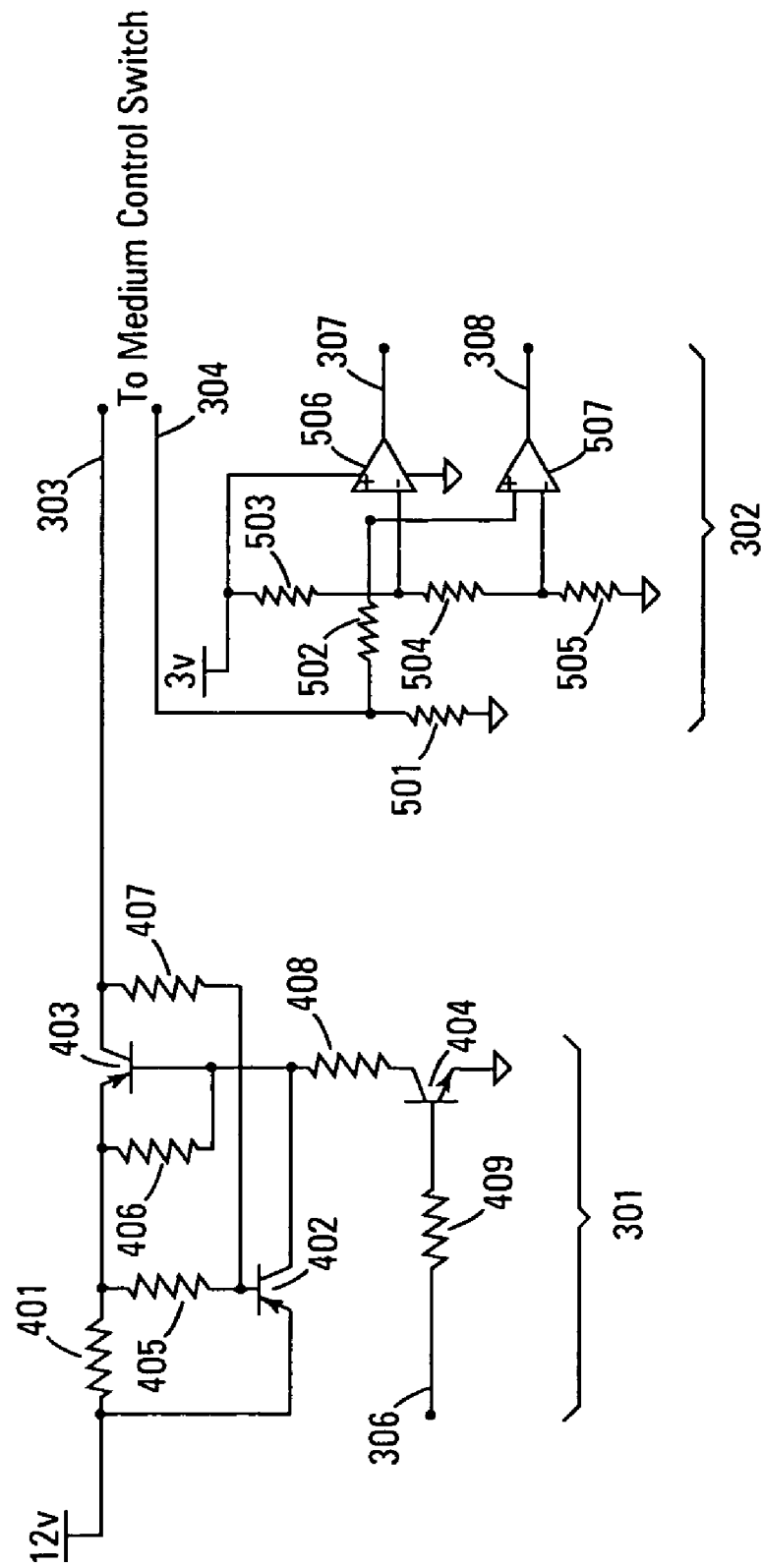
FIG. 3 is a schematic diagram of circuitry included in an interface card of an embodiment of the present invention.

The above embodiment of the present invention requires one medium control switch as opposed to two switches necessary for prior systems. Typically, cards 201 and 202 are the same by design. One of them is considered primary and another becomes a protection card. Each card includes relay control circuitry and feedback circuitry. Referring to FIG. 3, an embodiment of relay control circuitry 301 and feedback circuitry 302 is described. Input node 306 receives an activation signal from the management card, and output nodes 307 and 308 are coupled to provide feedback to the management card. During an evaluation operation, either during troubleshooting or at initialization, the management card activates node 306 (high voltage). Input transistor 404 is connected to node 306 through resistor 409. A current-limiting resistor 408 is coupled to transistor switch 403. When transistor 404 is activated, transistor 403 is activated and node 303 is pulled high. Node 303 is coupled to either an LED or an LED and relay. Feedback circuit 302 is used to identify the card as either a primary (LED only) or a secondary (LED and relay).

Feedback circuit 302 contains two comparators 506 and 507, and current sensor resistor 501. First inputs of comparators are connected to current sensor resistor 501 through a balance resistor 502. Second inputs of comparators are connected to voltage references, for instance, a resistor divider circuit 503, 504, 505. If there is no current conducted through resistor 501, a voltage on the first inputs of the comparators is lower than reference voltage applied to their second input. As a result, both comparators output logic ZERO indicating no current through the load connected to 303 and 304. If the card is connected to an LED, the voltage drop across resistor 501 activates comparator 507, but not comparator 506. If the card is coupled to an LED and the switch relay 226, the voltage drop across resistor 501 activates comparator 507 and comparator 506.

In addition to identifying the primary and secondary cards, the management card, or external processor, can determine if nodes 303 and 304 are broken or shorted. If there is no connection between nodes 303 and 304, a voltage across resistor 501 is 0V and both comparators output logic ZERO. If node 303 is shorted to either node 304 or ground, then transistor 403 is turned OFF and a voltage across resistor 501 is also 0V.

If node 303 is shorted, the current conducted through resistor 401 provides a voltage drop across resistor 401 that is sufficient to turn ON safety transistor 402. When transistor 402 turns ON, transistor 403 is partially turned off. Resistor 407 helps to further reduce current through transistor 403. A voltage drop across resistor 405 is added to the voltage across resistor 401 to turn ON transistor 402 and to turn transistor 403 OFF. As such, safety transistor 402 turns off transistor 403 when the current through resistor 401 is above a threshold level.

Because the management card "doesn't know" which interface card is connected as a primary or protection, an evaluation operation is performed by turning transistor 404 ON and monitoring the feedback. If a low current load is detected, the evaluated card is determined to be connected as a primary card. If a high current load is detected, the evaluated card is determined to be connected as a protection card. When a protection card is detected, the management card turns transistor 404 OFF immediately to prevent the switching of relay 226. The management card stores identification information about the primary and protection status of the cards. The management card can then inform a technician what equipment slot contains the primary card and what equipment slot contains the protection card. The management card can also switch from the primary to the protection card as soon as a failure on the primary card has been detected. It will be appreciated by those skilled in the art with the benefit of the present invention that the management card can implement any failure/defect monitoring and identification method without departing from the present invention.

Figure 4:
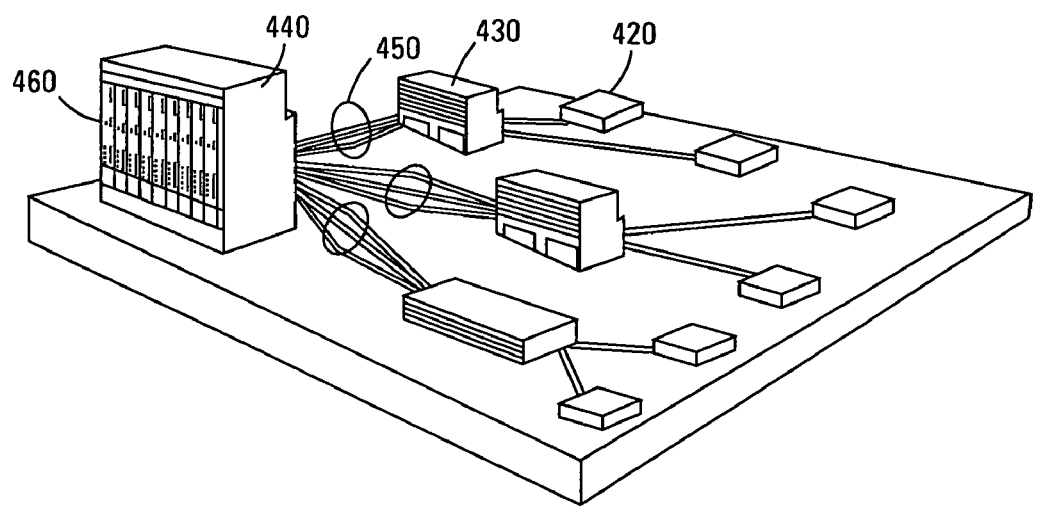
FIG. 4 illustrates a telecommunication system of an embodiment of the present invention.

FIG. 4 illustrates a communication system of an embodiment of the present invention. The system includes client locations 420 that are coupled to communicate with remote transceiver stations 430. Transceiver stations 430 operate as relay stations to coordinate the communication between the clients and a central station 440. All of the locations are coupled together using one or more communication media 450. As such, both the remote and central station can include primary and secondary interface cards, as described above. For example, the central station 440 has numerous cards 460 that are coupled to a back plane (not shown) for communication with the remote stations.

CONCLUSION

A communication system has been described that includes primary and secondary interface cards. A switching circuit allows both of the interface cards to selectively communicate over a medium without inducing reflection. Further, an automatic detection system is provided to allow a management circuit to identify which interface card is coupled as the primary or secondary card.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A communication system comprising:
   a switch circuit;
   a primary interface card couplable to a communication medium connection via the switch circuit;
   a secondary interface card coupled to the switch circuit, wherein the secondary interface card controls the switch circuit to decouple the primary interface card from the communication medium connection and couple the secondary interface card to the communication medium connection via the switch circuit, and wherein the switch circuit is external to the primary interface card; and
   a management card coupled to the primary and secondary interface cards, wherein the management card monitors the current loads of the primary and secondary cards to identify the cards;
   wherein the primary card is coupled to illuminate a light emitting diode (LED) when the primary card is operational, wherein the illuminated LED determines a current load of the primary card; and
   wherein the secondary card is coupled to illuminate a light emitting diode and activate a relay when the secondary card is operational, wherein the illuminated LED and activated relay determine a current load of the secondary card.

2. The communication system of claim 1 further comprising:
   a management card coupled to the primary and secondary cards, wherein the management card instructs the secondary interface card to operate the switch circuit to decouple the primary interface card, wherein the management card monitors the current loads of the primary and secondary cards to identify the cards.

3. The communication system of claim 1 wherein the primary and secondary cards each include circuitry to output signals that identify if the card is primary or secondary.

4. A communication system comprising:
   a communication medium;
   a switch circuit including a relay;
   a first interface card coupled to the communication medium via the switch circuit;
   a second interface card coupled to the relay and switch circuit, wherein the second interface card controls the relay to decouple the first interface card from the communication medium and couple the second interface card to the communication medium via the switch circuit;
   a management circuit coupled to the first and second interface cards, wherein the management circuit selectively activates either the first or second interface card and determines if the first or second interface is coupled to the relay, wherein the management circuit monitors a current load of the first and second interface card to determine if the first or second interface card is coupled to the relay.

5. The communication system of claim 4 wherein the management circuit activates the second interface card in response to an operational defect of the first interface card.

6. A communication system comprising:
   a switch circuit including a light emitting diode (LED) and a relay;
   an interface card coupled to the switch circuit, the interface card comprising,
   a relay control circuit coupled to selectively activate the relay, the relay control circuit is further coupled to illuminate the LED, and
   a feedback circuit to monitor a current loud of the relay control circuit and provide output signals; and
   a management circuit coupled to the interface card, wherein the management circuit selectively activates the relay control circuit and monitors the output signal of the feedback circuit.

7. The communication system of claim 6 wherein the relay control circuit comprises:
   a switch transistor coupled to source current to the LED and relay;
   an input transistor coupled to selectively activate the switch transistor; and
   first and second comparator circuits coupled to compare a current conducted through the switch transistor with first and second references, respectively.

8. The communication system of claim 7 wherein the relay control circuit further comprises a safety circuit to deactivate the switch transistor if the relay control circuit is shorted.

9. A method of operating a communication system comprising:
   selectively activating a primary interface card using a management card;
   monitoring a current load of the activated primary interface card;
   identifying an interface card as either the activated primary interface card or a secondary interface card based upon the monitored current load; and
   storing the identification information.

10. The method of claim 9 wherein the primary interface card current load is defined by a current through a light-emitting diode (LED) coupled to the primary interface card.

11. The method of claim 9 further comprising:
    selectively activating the secondary interface card using a management card;
    monitoring a current load of the activated secondary interface card;
    identifying the activated secondary interface card based upon the monitored current load; and
    storing the identification information.

12. The method of claim 11 wherein the secondary interface card current load is defined by a current through a light-emitting diode (LED) and a relay circuit coupled to the secondary interface card.

13. A method of identifying an interface card comprising:
    activating the interface card;
    comparing a current load of the interface card to first and second references;
    identifying the interface card as either a primary card or a secondary card based upon the comparison; and
    storing data indicating the result of the identification.

14. The method of claim 13 wherein the secondary card operates a switch relay circuit and has a higher current load than a current load of the primary card.

15. A method of operating a communication system comprising:
    coupling a primary interface card to a communication medium via a medium control switch, wherein the medium control switch is external to the primary interface card;
    detecting an operational error of the primary card;
    decoupling the primary interface card from the communication medium;
    coupling a secondary interface card to the communication medium via the medium control switch;
    monitoring a current load of the primary interface card;

identifying the interface cards as either the primary interface card or the secondary interface card based upon the monitored current load; and storing the identification information.

16. The method of claim 15 wherein the secondary interface card controls the medium control switch.

17. The method of claim 15 wherein a management card detects the operational error of the primary card and instructs the secondary card to activate the medium control switch to decouple the primary interface card from the communication medium and couple the secondary interface card to the communication medium.

18. A communication interface card comprising:
   a relay control circuitry to provide an output signal to a communication switch circuit; and
   a feedback circuit coupled to the communication switch circuit to monitor a load current of the communication interface card through the communication switch circuit, wherein the feedback circuit includes:
      a current sensor resistor coupled to an input node;
      a first comparator to compare a voltage drop across the current sensor resistor with a first reference voltage; and
      a second comparator to compare the voltage drop across the current sensor resistor with a second reference voltage.

19. The communication interface card of claim 18 wherein the relay control circuitry comprises:
   a switch transistor to couple a voltage source to an output node to provide the output signal; and
   an input transistor coupled to activate the switch transistor in response to an externally provided activation signal.

* * * * *

UNITED STATES PATENT AND TRADEMARK OFFICE
CERTIFICATE OF CORRECTION

PATENT NO. : 6,978,395 B2
APPLICATION NO. : 10/119483
DATED : December 20, 2005
INVENTOR(S) : Gottlieb Page 1 of 1

It is certified that error appears in the above-identified patent and that said Letters Patent is hereby corrected as shown below:

At Claim 6, Column 6, Line 1, replace the first occurrence of "loud" with --load--

Signed and Sealed this

Eighteenth Day of November, 2008

JON W. DUDAS
*Director of the United States Patent and Trademark Office*